(12) United States Patent
Zhao et al.

(10) Patent No.: US 9,277,009 B2
(45) Date of Patent: *Mar. 1, 2016

(54) METHOD AND SYSTEM FOR MANAGING DATA IN A COMMUNICATION NETWORK

(71) Applicant: Google Technology Holdings LLC, Mountain View, CA (US)

(72) Inventors: David Long Zhao, Bothell, WA (US); Kevin John West, Kirkland, WA (US); Vijay Krishnan Mani, Kenmore, WA (US)

(73) Assignee: Google Technology Holdings LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/568,901

(22) Filed: Dec. 12, 2014

(65) Prior Publication Data

US 2015/0101027 A1 Apr. 9, 2015

Related U.S. Application Data

(60) Continuation of application No. 13/929,650, filed on Jun. 27, 2013, now abandoned, which is a division of application No. 12/657,931, filed on Jan. 29, 2010, now Pat. No. 8,510,848.

(60) Provisional application No. 61/206,588, filed on Feb. 2, 2009.

(51) Int. Cl.
*G06F 17/30* (2006.01)
*H04L 29/08* (2006.01)
*G06F 21/60* (2013.01)
*H04L 29/06* (2006.01)

(52) U.S. Cl.
CPC ...... *H04L 67/1095* (2013.01); *G06F 17/30094* (2013.01); *G06F 21/60* (2013.01); *H04L 63/10* (2013.01); *H04L 67/02* (2013.01); *H04L 67/06* (2013.01); *H04L 67/2842* (2013.01)

(58) Field of Classification Search
CPC ....... H04L 63/08; H04L 63/10; H04L 63/101; H04L 67/02; H04L 67/06; H04L 67/2842; G06F 21/10; G06F 21/60; G06F 21/6218; G06F 21/6227; G06F 21/6245; G06F 17/30
USPC .............. 726/2–7, 26–30; 713/165–167, 193; 707/783–788
See application file for complete search history.

(56) References Cited

U.S. PATENT DOCUMENTS 7,243,147 B2 * 7/2007 Hodges et al. ................ 709/224
7,243,236 B1 7/2007 Sibert
(Continued)

*Primary Examiner* — Hosuk Song
(74) *Attorney, Agent, or Firm* — Lerner, David, Littenberg, Krumholz & Mentlik, LLP

(57) ABSTRACT

A method for managing a plurality of files in a communication network having a plurality of clients includes a server receiving (502) metadata associated with a secured file stored in a virtual data drive of a first client. The server also receives (504) data segments associated with the file from the virtual data drive of the first client. The server stores the metadata and data segments associated with the file at the server. The server generates (506) a first representation of the file based on the received metadata and data segments associated with the file and sends (508) the first representation of the file to the plurality of clients. Next, the server receives (510) a request from a second client for at least one data segment of the file. The server authenticates the request based on a plurality of access rights of a user of the second client and sends (512) the at least one data segment of the file to the second client when the request is authenticated.

10 Claims, 8 Drawing Sheets

(56) References Cited

U.S. PATENT DOCUMENTS

| | | |
|---|---|---|
| 7,506,034 B2 | 3/2009 | Coates et al. |
| 7,549,047 B2 | 6/2009 | Balfanz et al. |
| 7,614,077 B2 * | 11/2009 | Brew et al. .................. 726/1 |
| 7,636,825 B2 | 12/2009 | Mosek |
| 7,657,581 B2 | 2/2010 | Orenstein et al. |
| 7,685,096 B2 * | 3/2010 | Margolus et al. ............. 713/165 |
| 7,707,618 B1 * | 4/2010 | Cox et al. ........................... 726/1 |
| 7,743,423 B2 | 6/2010 | Lange et al. |
| 8,510,848 B1 | 8/2013 | Zhao et al. |

* cited by examiner

| Beginning metadata | First data segment | Remaining data segments | Last data segment | Ending metadata |
|---|---|---|---|---|

FIG. 4F

| Beginning metadata | Ending metadata | Remaining data segments | Last data segment | First data segment |
|---|---|---|---|---|

FIG. 4G

METHOD AND SYSTEM FOR MANAGING DATA IN A COMMUNICATION NETWORK

CROSS-REFERENCE TO RELATED APPLICATIONS

The present application is a continuation of U.S. patent application Ser. No. 13/929,650 filed Jun. 27, 2013, which is a divisional of U.S. patent application Ser. No. 12/657,931 filed Jan. 29, 2010, which claims priority from U.S. Provisional Application No. 61/206,588 filed Feb. 2, 2009 all of which are incorporated herein by reference.

FIELD OF THE DISCLOSURE

The present disclosure relates to managing data in a communication network. More specifically, the present disclosure relates to providing access to data stored in a remote storage using a virtual data drive.

BACKGROUND

Typically, data in the form of files such as documents, image files, and audio/video/multimedia files is stored as a sequence of data bytes in a computer's local storage, for example, the hard drive of the computer. Storing data in a local storage has a few limitations. One of such limitations is that only a restricted volume of data can be stored because of the limited capacity of the storage. For example, most of the personal computers available in market have a local storage of 40 Gigabytes (GB) to 320 GB. Another limitation is that the local storage is neither secure nor reliable because data cannot be retrieved when the computer malfunctions or gets damaged. Also, if the computer is lost or stolen, data can be accessed by unauthorized users and can be misused. For example; confidential data such as personnel details stored in a laptop can be accessed by unauthorized users for criminal activities.

To overcome these limitations associated with the local storage, service providers enable users to store data at remote storage sites connected through networks. Mostly, these remote storage sites are utilized as seamless backups or synchronization devices to maintain copies of data present in the local storage of the computer. When a file is created by a user in the local storage, a copy of the file is automatically created at the remote storage site. Similarly, when the user modifies a file stored in the local storage, the same modification is automatically made to the copy of the file at the remote storage site. In this scenario, if a user intends to store a 400-GB data in the remote storage, he requires a local storage of 400 GB connected to his computer. Therefore, in this case, the user may be required to connect an external hard drive to his/her computer, or may be required to upgrade the local storage of his/her computer. This requires additional expenditure and hence is not an efficient way to store a large amount of data.

Another manner in which the remote storage sites are utilized is non-seamless. Users having an access to the remote storage sites manually upload and download data to and from the remote storage sites. In this scenario, only the downloaded data is stored in the local storage "of the computer. Also, in this case, if the user intends to make modification to an already uploaded file, he/she has to manually download the file on the local storage and then make changes to it. Therefore, he/she has to upload the modified file on the remote storage site again. Also, in the case of remote storage sites, users have to continuously keep track of the free space available in the local storage of their computers as they need to delete files from the local storage to vacate space for files they intend to download. Thus, at every step, user's manual intervention is required—making this process entirely non-seamless.

In light of the foregoing, it is desirable to have a system that enables users to seamlessly store data at a remote storage without maintaining a copy of the data at the local storage. Also, the system should not require the user to manually download a file on his/her local storage every time he/she wants to make changes to the file already on the remote storage.

BRIEF DESCRIPTION OF THE DRAWINGS

Embodiments of the disclosure are described in conjunction with the appended drawings to illustrate, and not to limit, the disclosure. Like designations denote like elements, and in which:

FIGS. 4A-4G illustrates various embodiments of a first representation and a second representation of a file, in accordance with an embodiment of the disclosure;

DETAILED DESCRIPTION

Before describing in detail the embodiments in accordance with the disclosure, it should be observed that these embodiments reside primarily in the method and system used for managing data in a communication network. Accordingly, the method steps and system components have been represented to show only those specific details that are pertinent for an understanding of the embodiments, and not details that will be apparent to those with ordinary skill in the art.

Figure 1:
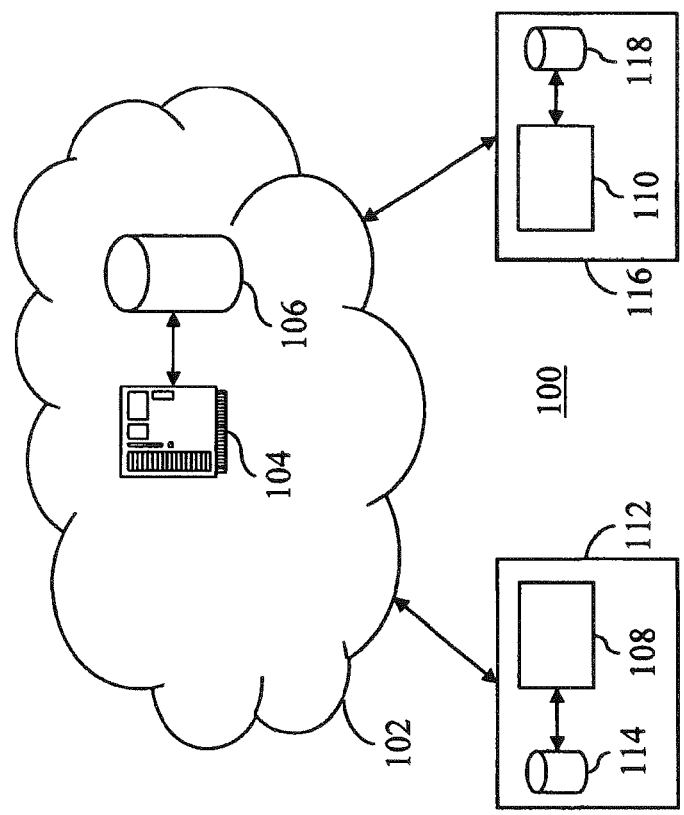
FIG. 1 illustrates the architecture of a data management system where various embodiments of the disclosure can be practiced.

FIG. 1 illustrates the architecture of a data management system 100 where various embodiments of the disclosure can be practiced. Data management system 100 is implemented over a communication network 102. Examples of communication network 102 include a Local Area Network (LAN), a Wide Area Network (WAN), cellular network, cloud computing network, high speed cable network, and the Internet. Communication network 102 includes a server 104 connected to a remote storage 106. In accordance with one implementation, server 104 is a stand-alone server connected to remote storage 106. In accordance with another implementation, server 104 is a cluster of servers connected to remote storage 106. Examples of server 104 include, but not limited to, a MySQL Amazon EC2®, and Ruby on Rails®. Example of remote storage includes, but is not limited, to Amazon S3®.

Data management system 100 includes one or more clients connected to communication network 102. These clients are shown as a first client 108 and a second client 110 in FIG. 1.

In the description of the present patent application, the term "clients" refers to computer program applications installed to access data stored at remote storage 106. As depicted, first client 108 and second client 110 are installed on a computational device having a local storage, shown as a first computational device 112 having a first local storage 114 and a second computation device 116 having a second local storage 118. Examples of computational devices include, but are not limited to, a computer, a laptop, a personnel data assistant (PDA), and a mobile phone. Examples of local storage include, but are not limited to, a hard disk and a solid-state drive. In accordance with another embodiment, local storage may comprise a metadata store and a data store such that metadata associated with a file is stored in the metadata store of the local storage and data segments associated with the file are stored in the data store of the local storage.

As mentioned, first client 108 and second client 110 are applications running on first computational device 112 and second computation device 116, respectively. In one example, client 108 is a web browser. In another example, client 108 is a standalone-client application based on JAVA. Further, operating systems such as Windows®, Linux, and Macintosh® (Mac) are installed on computational devices 112 and 116.

First client 108 enables computational device 112 to communicate with server 104 and receive data stored in remote storage 106. Further, client 108 enables its user to upload a file on remote storage 106 by placing the file in a virtual data drive of first client 108. In accordance with an embodiment of the disclosure, the virtual data drive is a shortcut in the form of an icon that can be used to upload one or more files to server 104. For example, if first client 108 runs on the Microsoft® Windows® operating system, the virtual data drive is displayed with other data drives, such as a C drive or a D drive. When the user of first client 108 places a file in the virtual data drive of first client 108, the data segments and metadata associated with the file are transferred from local storage 114 to remote storage 106. Based on the received metadata and data segments, server 104 generates a first representation of the file and sends a message describing the first representation of the file to clients 108 and 110. On receiving the message from server 104, second client 110 stores the first representation of the file in local storage 118 and first client 108 stores it in local storage 114.

In accordance with another embodiment, first client 108 can also generate a default first representation of the file uploaded to remote storage 106. In this case, the first representation of the file is not sent to first client 108 by server 104, and only sent to second client 110.

The first representation of the file has a smaller size as compared with the size of the file. Typically, the first representation of the file includes metadata associated with the file. The metadata associated with the file includes data related to the hierarchy of directories associated with the file. In one implementation of the disclosure, the first representation also includes some data segments associated with the file. For example, if the file is a music file, the first representation of the music file may include metadata associated with the music file, and the first and last data segments of the music file. Examples of the metadata include size of the music file, artist name, song name, album name, composer name, offset of the music file in the remote storage, and date of creation of the music file. In accordance with another implementation, the first representation of the file does not include any metadata or data segment associated with the file. In this case, the first representation can be, for example, only the name of the music file and the like.

In accordance with an embodiment of the disclosure, the first representation of the file is determined by server 104 based on a set of attributes related to the file. For example, the set of attributes may include name, size of the file, content or content overview of the file, timestamp of creation, and timestamp of modification. Also, the first representation of the file determines the format in which first client 108 and second client 110 store the file in their corresponding local storages. For example, if the file contains an image, the first representation of the file can be a copy of the image having a lower resolution.

In accordance with an embodiment of the disclosure, the first representation of the file is treated as a valid system file object by applications installed on computational devices 112 and 116 i.e. applications can use the first representation of the file as a valid form of the file. For example, if the first representation of an image file is a thumbnail, then the thumbnail can be accessed by a "Picture Viewer" application in the same way as "Picture Viewer" accesses the image file.

Once the first representation is received by first client 108 and second client 110, either of the clients can send a request to server 104 to access the uploaded file if it is not available in corresponding local storage. For example, if the uploaded file is a song and after viewing the first representation of the song, the user of second client 110 wants to view the entire song, he/she can send a request to server 104 to listen to the song. Thereafter, server 104 receives this request from second client 110 and grants the user access to the song if he/she has access rights to view the song. In this case, server 104 streams data segments associated with the song from remote storage 106 to second client 110. According to an embodiment, one or more data segments associated with the file are streamed from remote storage 106 and stored at local storage 118 of second client 110 if the request is not for a "secured file". For example, if while uploading the song to remote storage 106, the user of first client 108 does not classify the song as a "secured file", the song is cached at local storage 118 of second client 110 when second client 110 gets access to the song. However, if the user of first client 108 classifies the song as a "secured file", the song is not cached at local storage 118 of second client 110. In this case, second client 110 only stores basic metadata such as file name and file creation timestamp in local storage 118.

However, if the file (movie song) is available in local storage 118 of second client 110, the request to server 104 is not sent and the file already stored in local storage 118 is provided to second client 110. In other words, second client 110 only requests for files which are not saved or cached in its local storage 118.

In accordance with an embodiment of the disclosure, the number of data segments cached at local storage 118 of second client 110 is based on one or more parameters of the communication network. The one or more parameters include, but are not limited to, bandwidth of the communication network and connection speed. For example, when second client 110 is connected to server 104 through a cellular network, the number of data segments being transferred by server 104 and subsequently cached in local storage 118 of second client 110 is less than the number of data segments transferred by server 104 and subsequently cached in local storage 118 when second client 110 is connected to server 104 through a high-speed cable connection.

In accordance with another embodiment, one or more data segments associated with the file are synchronously accessed from remote storage 106 for the user using first client 108. For example, a user of first client 108 can request access to a document which is being edited by a user of second client 110. The changes being made to the document by the user of second client 110 are received by server 104 that further updates the document correspondingly. Server 104 also sends the updated document for access to the user of first client 108. Thus, the user of first client 108 can synchronously access the document being changed by the user of second client 110.

In accordance with an embodiment of the disclosure, if the file requested by second client 110 is a media file, only the data segments which are not included in the first representation of the file are sent to second client 110. For example, if the first representation (which is already stored in local storage 118 of second client 110) has the first and last data segments of the song, only the remaining data segments are sent to second client 110. On the contrary, if the file is a document, the first representation of the document includes metadata associated with the document and all the data segments are sent to second client 110 in this case.

In accordance with another embodiment, if few data segments are already present in local storage 118 of second client 110, those data segments are not requested by second client 110 while sending the request to server 104 and only remaining data segments are requested. For example, if some of the data segments of a song are already saved or cached in local storage 118, only the remaining data segments of the song are requested by second client 110.

On receiving the data segments, according to one example, second client 110 adds the received data segments to the first representation of the file to create a second representation of the file. In one embodiment, second client 110 receives all data segments associated with the file and replaces the first representation of the file with the second representation of the file in local storage 118. In this case, the second representation of the file is a complete file, i.e., all the data segments associated with the file are stored in local storage 118.

In accordance with another embodiment, client 110 is configured to send a request to server 104 for a "random" access of a file. For example, the virtual data drive enables second client 110 to randomly access a particular data segment associated with the file without downloading all the data segments associated with the file starting from the beginning. For example, when a user of client 110 wants to play a music file in a media player, he/she may jump to the middle of the song. In this case, second client 110 requests for data segments located in the middle of the sequence of data segments of the song. Thus, data segments from the middle of the song are streamed from remote storage 106 to second client 110. In other words, if the user decides to play the initial portions of the music file, then second client 110 requests only the necessary data segments and creates a "chunk file" that only takes up as much storage as the size of the music file even though its data segments may be organized differently based on the nature in which the file was read.

Server 104 is further configured to generate the first representation of a file when the file is modified in remote storage 106. For example, if second client 110 modifies a file stored at remote storage 106, server 104 determines an updated first representation of the file and sends it to first client 108 and second client 110.

In accordance with another example, server 104 is configured to allow offline access to a file such that second client 110 can request which files it will require for offline access. In this case, server 104 would send the requested files to second client 110. For example, a user of second client 110 may wish to access a music file for later use when second client 110 will not be connected (in the future) to communication network 100. In this case, server 104 provides the entire music file to local storage 118 of second client 110 so that the user can play the music file even when second client 110 is not connected to communication network 100.

In accordance with an embodiment, each user should have the access rights to' clients 108 and 110 to be able to access or upload files to and from server 104. Server 104 is configured to create accounts for each user and define access rights to users of clients 108 and 110. Based on the account, server 104 is further configured to authenticate users of clients 108 and 110. An account is created for a user by server 104 when the user signs-up with server 104. The user account is created by supplying a username and a password along with additional personal information such as name, date of birth, sex, and country. Access rights include a combination of the right to upload files to the server, the right to read or modify files, the right to delete files, and the like.

In accordance with an embodiment of the disclosure, a file uploaded by a user of first client 108 into the virtual data drive of first client 108 is not removed from local storage 114 unless there is need to free up space in local storage 114. In this case, the file is kept in local storage 114 of first client 108 and uploaded to server 104 as well. Further, in this case, the first representation of the file generated by server 104 is also received by first client 108, although it already has the uploaded file.

Although the above description relates to uploading a file in remote storage 106 by saving the file in a virtual drive, in accordance with an embodiment of the disclosure, data segments associated with the file can automatically be transferred to remote storage 106 to free memory in local storage 114 for new files. For example, a user uploads a video movie file to the virtual data drive which already has a number of song files stored in it. Once the song files stored in the virtual data drive have been transferred to remote storage 106 they can be removed from local storage 114 to free space for the video movie file.

Figure 2:
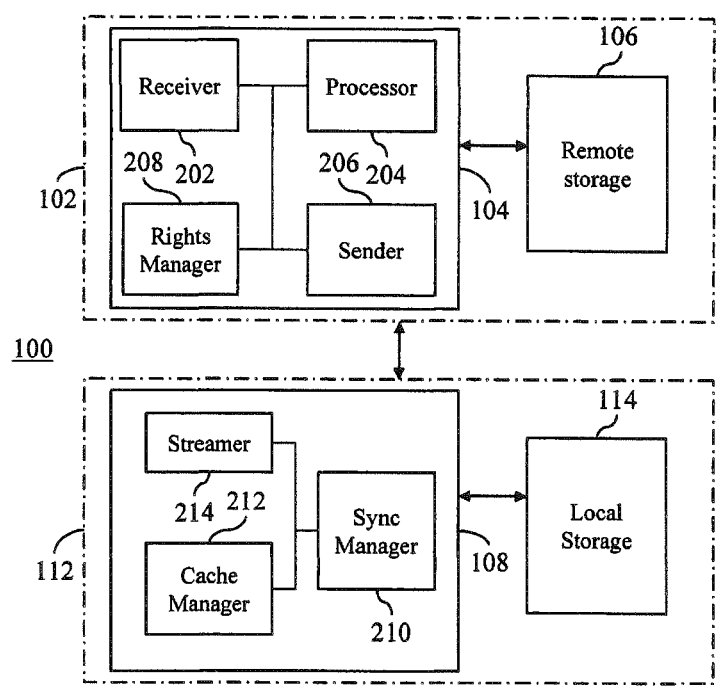
FIG. 2 illustrates a hierarchical representation of the data management system, in accordance with an embodiment of the disclosure.

FIG. 2 illustrates the hierarchical representation of data management system 100, in accordance with an embodiment. Data management system 100 is implemented over server 104 connected to computational device 112 via communication network 102. Computational device 112 includes client 108 connected to local storage 114. Server 104 is connected to remote storage 106.

Before a user of client 108 can access or upload files to server 104, the user has to sign-up with server 104. By signing-up with server 104, a user account is created for the user with a username and password along with additional personal information. Each user account is provided with access rights by a rights manager 208. Access rights provided by rights manager 208 may include a combination of the right to upload files to the server, the right to read or modify files, the right to delete files, and the like.

In accordance with an embodiment, to upload a file in remote storage 106, a user of client 108 uploads a file into a virtual data drive of computational device 112. Metadata and data segments associated with the file uploaded into the virtual data drive are received by a receiver 202 of server 104. The metadata associated with the file includes, but is not limited to, data related to the hierarchy of directories associated with the file and file attributes. For example, if a user uploads a song file using the virtual data drive of computation device 112, the metadata of the song can include the size of the file, artist name, track name, etc.

After receiving the metadata and data segments associated with the file, a processor 204 of server 104 generates a first representation of the file based on the metadata and data segments received by receiver 202. The first representation of the file is smaller in size as compared with that of the file. In the example, the first representation of the song file can be the artist name, track name, and the starting and ending segments of the song.

A sender 206 of server 104 sends the first representation of the file to all clients (not shown in FIG. 2) present in the communication network. In the embodiment shown in FIG. 2, sender 206 sends the first representation of the file to client 108. When the 10 first representation is received, it is stored in local storage 114 associated with client 108 of computational device 112.

After receiving the first representation and viewing it, the user of client 108 may want to view the entire file or some part of it. In this case, the user of client 108 requests access to one or more data segments of the file. Client 108 checks if the requested data segments of the file are available in local storage 114. If the requested data segments are available in local storage 114, client 108 provides the requested data segments of the file to the user. If the requested data segments are not available in local storage 114, client 108 sends a request to server 104 to access the one or more data segments of the file stored in remote storage 106. In the previous example, the user may wish to play the song file. Client 108 checks if the song file is available for playback in local storage 114. If it is not available, client 108 sends a request to server 104 for playing the song file.

Receiver 202 of server 104 receives this request. Processor 204 of server 104 processes the request and instructs sender 206 of server 104 to establish a streaming connection with a streamer 214 of client 108 and begin streaming the requested data segments of the file. A cache manager 212 associated with client 108 receives the streamed data segments of the file from sender 206 of server 104 to enable access by the user of computational device 112. In the example, the user wants to play the song file which is stored in remote storage 106 of server 104. Streamer 214 of the client receives the stream of data segments of the song file from sender 206 of server 104 and cache manager 212 of client 108 begins to catch the stream of data segments of the song file for playback by computational device 112.

In another example, the user of computational device 112 can modify one or more data segments of the file. In this case, client 108 sends a request to server 104 for modifying one or more data segments of the file stored in remote storage 106. Receiver 202 of server 104 receives the request. Processor 204 of server 104 processes the request and instructs sender 206 of server 104 to send the requested data segments of the file to client 108. The user can then modify the one or more data segments. The modified data segments are sent back to server 104 by a sync manager 210. Receiver 202 of server 104 receives the modified data segments and processor 204 updates the first representation of the file based on the modified data segments. Sync manager 210 of client 108 then synchronizes and updates the first representation of the file stored in local storage 114 with the first representation of the file stored at remote storage 106 of server 104. The updated first representation of the file is then sent by sender 206 to all clients connected to server 104. For example, a user may modify an image stored in remote storage 106 of server 104. Sender 206 provides the image to client 108 of computational device 112 to enable editing by the user. The edited image is updated in remote storage 106 of server 104. Processor 204 of server 104 updates the first representation of the image and sync manager 210 of client 108 synchronizes the first representation of the image stored in local storage 114 of client 108 with the updated first representation of the image provided by server 104.

In accordance with yet another example, the user of client 108 requests to enable access to one or more data segments of a secured file. Client 108 sends a request to server 104 to enable access to the one or more data segments of a secured file stored in remote storage 106. For example, the user of computational device 112 may wish secure access to a financial document. In this case, client 108 sends a request to server 104 for secure access to the financial document and this request is received by receiver 202.

The received request is processed by processor 204 of server 104, and processor 204 in turn sends a request to rights manager 208 for authenticating the user of client 108 based on the access rights of the user. If rights manager 208 authenticates the user, sender 206 is authorized to send the requested data segments of the secured file to client 108. In an embodiment, the requested data segments are directly streamed to streamer 214 of client 108 without being cached by cache manager 212 or stored by local storage 114 of client 108. In the example, if the user has access rights to the financial document, then server 104 provides secure access to the financial document and does not cache the financial document in local storage 114. In other words, the financial document bypasses local storage 114 and is directly streamed to client 108.

In accordance with another embodiment of the disclosure, the user of client 108 can also modify one or more data segments of a secured file by similar means and the updated first representation is then sent to all the clients of communication network 102.

Figure 3:
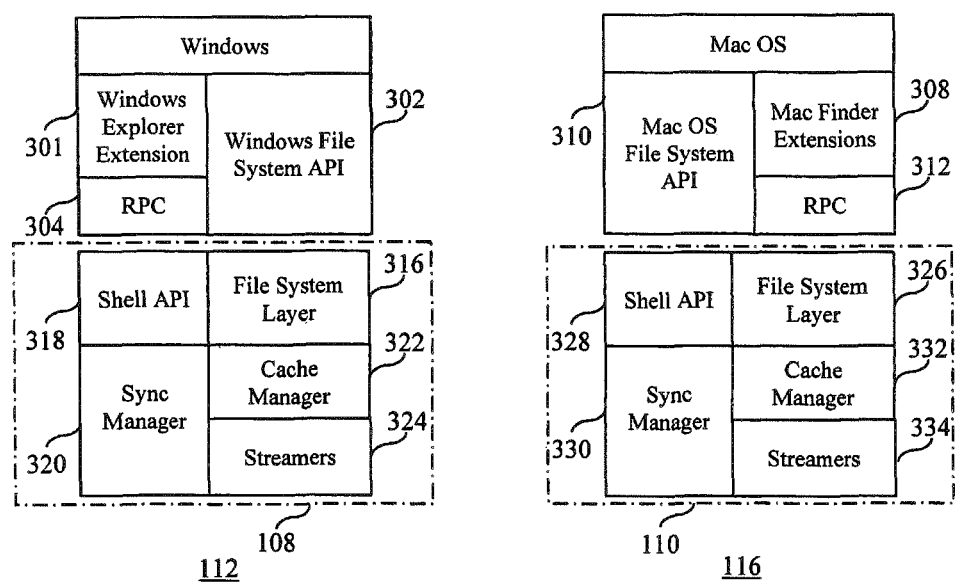
FIG. 3 illustrates the architecture of a computational device of the data management system, in accordance with an embodiment of the disclosure.

FIG. 3 illustrates the architecture of computational devices 112 and 116 of data management system 100, in accordance with an embodiment of the disclosure. Typically, computational devices 112 and 1.16 are computers that run a Windows® operating system or a Macintosh® operating system. In FIG. 3, computational device 112 is depicted running on Windows® operating system and computational device 116 running on Macintosh® operating system. As clients 108 and 110 are applications implemented using JAVA, they can be installed on both computational devices 112 and 116 and can enable computational devices 112 and 116 to establish a communication link with server 104 and access the files stored in remote storage 106.

As depicted, computational device 112 includes client 108, a windows explorer extension module 301, a Windows file system API module 302, and a Remote procedure call (RPC) module 304. Windows explorer extension module 301 provides additional functionalities to the user of client 108 by providing additional control elements. Examples of the control elements include buttons, menu items, and icon overlays. Windows file system application programming interface (API) module 302 facilitates the interception of the requests generated for accessing files. The requests are generated by the applications running on computational device 112. Further, Windows file system API module 302 facilitates direction of these requests to client 108.

Similarly, computational device 116 includes client 110, a Mac Finder extensions module 308, a Mac file system API module 310, and a Remote procedure call (RPC) module 312. The Mac Finder extensions module 308 provides additional functionalities to the user of client 110 by providing new control elements. Examples of the new control elements include new buttons, menu items, and icon overlays. The Mac file system API module 310 facilitates the interception of the requests generated to access files. The requests are generated by the applications running on computational device 112.

Further, Mac file system API module 310 facilitates direction of these requests to client 110.

In one embodiment, client 108 includes a File system layer 316, a Shell API module 318, a Sync Manager 320, a Cache Manager 322, and data streamers 324. The requests directed to client 108 by Windows file system API module 302 are handled by File system layer 316. File system layer 316 also enables computational device 112 to perform various operations on the files stored in remote storage 106. Examples of the various operations include opening a file, reading a file, seeking a file, creating a file, and modifying a file.

Extension calls generated by windows explorer extension module 301 for providing the additional control elements to the user of client 108 are handled by Shell API module 318.

Sync Manager 320 facilitates the synchronization of client 108 with server 104. During the synchronization, Sync Manager 320 detects and uploads newly created files to remote storage 106. Further, Sync manager 320 uploads the metadata associated with the files that are placed in the virtual data drive of client 108. Modifications made to these files are uploaded by Sync Manager 320. Sync Manager 320 is further configured to send periodic requests to server 104 for downloading modifications made by other clients on the files that are stored in local storage 114. Sync Manager 320 can thus download the updated first representation of the modified files and can also download the entire modified file to provide offline access to the file.

Cache Manager 322 is configured to store the first representation of a file in local storage 114 based on the message received from server 104. The first representation of the file is either stored automatically or on a request by the user. Moreover, Cache manager 322 is configured to receive data segments associated with the file from remote storage 106. On receiving the data segments, cache manager 322 transforms the first representation of the file to the second representation of the file. In one embodiment of the disclosure, cache manager 322 receives all data segments associated with the file and replaces the first representation of the file with all data segments of the file. Further, data streamers 324 are configured to download data segments from remote storage 106. In one example, data streamers 324 download data segments as multiple streams of data.

Similarly, client 110 includes a File system layer 326, a Shell API module 328, a Sync Manager 330, a Cache Manager 332, and data streamers 334. The functionalities of these elements are the same as those explained for client 108, and hence are not described again for the sake of simplicity.

FIGS. 4A-4G illustrate various embodiments of a first representation and a second representation of a file, in accordance with an embodiment of the disclosure. As already discussed, when client 108 uploads a file on remote storage 106, client 108 transfers metadata and data segments associated with the file from local storage 114 to remote storage 106. Thereafter, server 104 generates a first representation of the file based on the received metadata and data segments associated with the file, and sends the representation to the clients 108 and 110. Clients 108 and 110 then store the first representation of the file in their respective local storages Subsequently, to access the file stored in remote storage 106, client 110 can generate a request for one or more data segments of the file based on the first representation of the file. The request received by server 104 is processed by processor 204 of server 104, and the requested one or more data segments of the file are sent to client 110. Client 110 receives the requested one or more data segments of the file and generates a second representation of the file by adding the received one or more data segments of the file to the first representation of the file. For example, if a user uploads an image file to server 104 via client 108 such as an "image viewer" application software (for example IrfanView®), the server creates a thumbnail of the image file as the first representation of the image file and sends the thumbnail of the image file to clients 108 and 110. When the user clicks on the thumbnail, a request is sent to the server to receive the image file. The image file is received by the "image viewer" and displayed to the user.

Figure 4A:
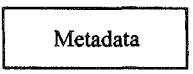

FIG. 4A illustrates a first representation of the file as stored in local storage 114. The first representation includes the metadata related to the file. The data segments associated with the file are stored at remote storage 106. For example, if the file being uploaded is a document, metadata such as file name, time stamp of creation, timestamp of modification, and reference to the document is stored in local storage 114.

Figure 4B:
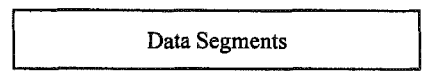

FIG. 4B illustrates a second representation of the file. In this representation, all data segments associated with the file are received from remote storage 106 and stored in local storage 114. In another embodiment, a subset of the data segments associated with the file is stored in local storage 114.

Figure 4C:
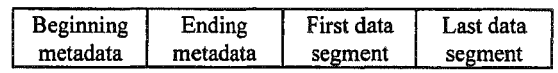

FIG. 4C illustrates another form of the first representation of the file stored in local storage 114. This representation includes the first data segment of the file, the last data segment of the file and metadata related to the file. The remaining data segments of the file are stored in remote storage 106. For example, if the file being uploaded is a music file, the first data segment of the music file, the last data segment of the music file, and the metadata related to the music file are stored as the first representation in local storage 118.

In accordance with another implementation, a compressed version of the file is stored with metadata as the first representation in local storage 114. For example, if the file is an image, a copy of the image having a lower resolution is stored in local storage 114.

Figure 4D:
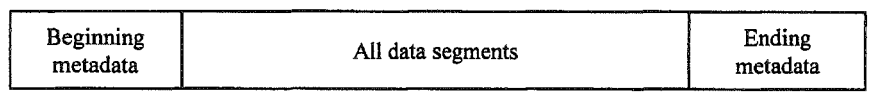

FIG. 4D illustrates another form of the second representation of the file. This representation includes a beginning metadata, all the data segments of the file, and the ending metadata of the file. For example, if the file is a music file, the beginning metadata related to the music file, all of the data segments of the music file and the ending metadata related to the music file are stored as the first representation in local storage 118.

Figure 4E:
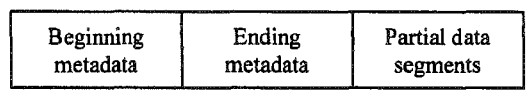

FIG. 4E illustrates yet another form of the first representation of the file. This representation includes a beginning metadata, partial data segments of the file, and the ending metadata of the file. For example, if the file is a music file, the beginning metadata related to the music file, partial data segments of the music file and the ending metadata related to the music file are stored as the first representation in local storage 118.

FIG. 4F illustrates yet another form of the second representation of the file. The second representation includes the first data segment of the file, the last data segment of the file, and remaining data segments of the file that are received from remote storage 106. Consider the example of the music file again. When computational device 116 launches a music player for playing the music file stored in remote storage 106, the player plays the first data segment of the music file as the first data segment is stored in local storage 118. While the first data segment is being played, the remaining data segments associated with the music file are continuously streamed from remote storage 106 and played as soon' as playing of the first data segment is over. As the rate of streaming data segments is higher than the rate at which the music file is played, the music file is continuously played without any latency. As a result, the user feels as if the music file is stored locally in local storage 118.

FIG. 4G illustrates yet another form of the second representation of the file. In this case, the second representation includes the first data segment of the file, the last data segment of the file and the remaining data segments. As depicted, the data segments of the file are not sequentially stored in local storage 118. For example, the remaining data segments are stored before the first data segment in the case shown in FIG. 4G. When the user accesses the file, the virtual data drive enables the user to access the data segments in the correct sequence, irrespective of the sequence in which they are stored.

Figure 5:
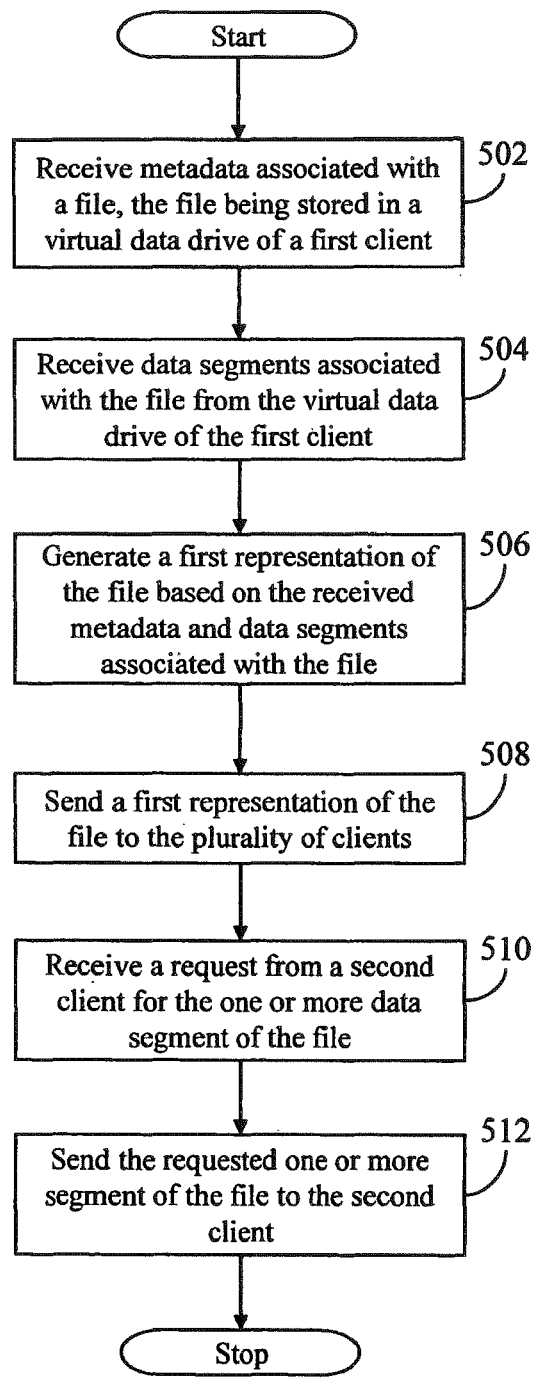
FIG. 5 is a flowchart illustrating a method for managing a plurality of files in a communication network, in accordance with an embodiment of the disclosure.

FIG. 5 is a flowchart illustrating a method for managing a plurality of files in a communication network, in accordance with an embodiment of the disclosure. At step 502, metadata associated with a file, uploaded or saved by a user for storage in the virtual data drive of client 108, is received by receiver 202 of server 104. The metadata associated with the file includes, but is not limited to, metadata related to the hierarchy of directories associated with the file, file name, file creation timestamp, file modification timestamp, size of the file, and content type of the file.

At step 504, data segments associated with the file saved in the virtual drive of client 108 are received by receiver 202 of server 104. At step 506, processor 204 of server 104 generates a first representation of the file, based on the received metadata and data segments associated with the file. The first representation of the file is also generated based on a set of attributes related to the file and a set of predefined rules. The set of attributes may include size of the file, content of the file, timestamps of creation, and timestamp of modification. Processor 204 also allows the user of client 108 (who uploads the file) to customize a set of predefined rules for generating the first representation of the file. The predefined rules include, but are not limited to, a combination of one or more attributes related to the file, such as type of file. As an example, a first representation of an image file is a compressed image smaller than the actual image and information about the author of the image. The user can customize this first representation of the file such that the first representation of the image file contains a thumbnail of the image file.

At step 508, sender 206 of server 104 sends the first representation of the file to clients 108 and 110 connected to server 104. Based on the received first representation, client 110 stores the first representation of the file in its local storage 118 and client 108 stores it in its local storage 114. After receiving the first representation of the file, client 110 can generate a request to access the data' segments of the file based on the first representation of the file. Client 110 checks whether the requested data segments associated with the file are present in local storage 118 (either saved or cached if the file was earlier accessed by client 110). Consider the example of a music file. When the music player is launched, client 110 checks whether the requested portions of the music file are already stored or cached in local storage 118. Client 110 accesses the requested data segments of the file when the requested data segments are stored or cached in local storage 118. The music player gets the access to the requested portions of the music file when they are stored or cached in local storage 118. If the requested data segments are not stored in local storage, client 110 generates a request based on the first representation of the file and sends the request to server 104. For example, when a user desires to view the image file using an application such as a' "Picture viewer", the compressed version of the file, i.e., a copy of the image file with lower resolution, is immediately displayed in the picture viewer. To improve the resolution of the displayed image, client 110 may send a request to server 104 for streaming the remaining data segments from remote storage 106 to local storage 118.

At step 510, receiver 202 of server 104 receives a request for access to one or more data segments of the file from client 110.

At step 512, sender 206 of server 104 sends the requested one or more data segments of the file to client 110. On receiving the stream of the requested data segments of the file from sender 206, the first representation of the file is transformed into a second representation of the file and provided to the user. In the example, the image file is received and displayed in the picture viewer. In another implementation, on receiving the remaining data segments, client 110 appends the received data segments with the first representation of the file. Consider the example of the music file where the first representation of the music file includes metadata associated with the music file, the first data segment of the music file, and the last data segment of the music file stored in local storage 118. When the user launches a music player to play the music file, the first data segment stored in local storage 118 is accessed by client 110 and played by the music player. Meanwhile, client 110 sends a request to server 104 for streaming the remaining data segments associated with the music file. As the remaining data segments are streamed from remote storage 106 to local storage 118, the remaining data segments are continuously played by the music player. Client 110 accesses the second representation of the music file, which includes the requested data segments associated with the music file. Subsequently, client 110 delivers the requested data segments in the right sequence to the music player.

Figure 6:
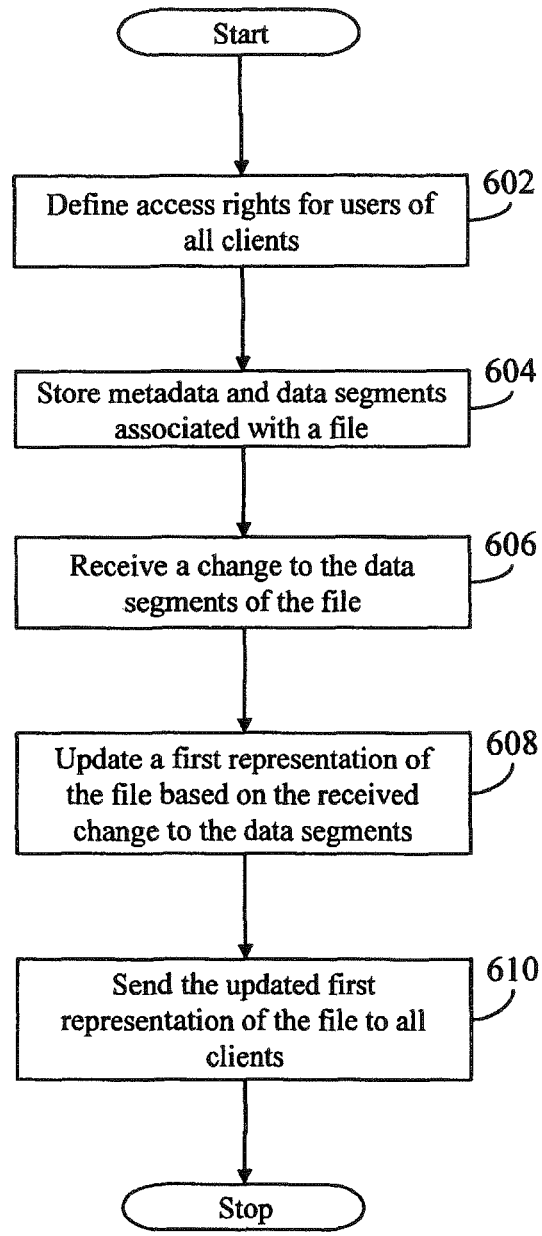
FIG. 6 is a flowchart illustrating a method for managing a server, in accordance with an embodiment of the disclosure.

FIG. 6 is a flowchart illustrating a method for managing server 104, in accordance with an embodiment of the disclosure. Each user should have the access rights to clients 108 and 110 to be able to access or upload files to and from server 104. At step 602, server 104 defines access rights to users of clients 108 and 110 by creating and configuring accounts for each user. Based on the created accounts, server 104 is further configured to authenticate users of Clients 108 and 110. An account is created for the user by server 104 when a user signs-up with server 104. The user account is created by entering a username and a password along with additional personal information such as name, date of birth, sex, and country. Access rights include a combination of the right to upload files to the server, the right to read or modify files, the right to delete files, and the like.

At step 604, remote storage 106 of server 104 stores the received metadata and data segments associated with the file when the user uploads the file into the virtual data drive of client 108. For example, a song file uploaded into the virtual data drive by the user is received by remote storage 106. An application running on computational device 116 is used by the user to make changes to the file.

At step 606, receiver 202 of server 104 receives the changes made to one or more data segments of the file. In our example, the user can make changes to the song file. The changed song file is received by server 104.

At step 608; processor 204 of server 1.04 updates the first representation of the file based on the changes made to one or more data segments of the file by the user. In the example, processor 204 updates the first representation of the song file based on the changes made to the song file.

At step 610, the updated first representation of the file is sent to clients 108 and 110. In an example implementation, the updated first representation of the file is synchronized with the sync managers of all the clients connected to the communication network. For example, the updated first representation of the music file is synchronized with all the music players in the network so that all music players can play the updated first representation of the music file.

Figure 7:
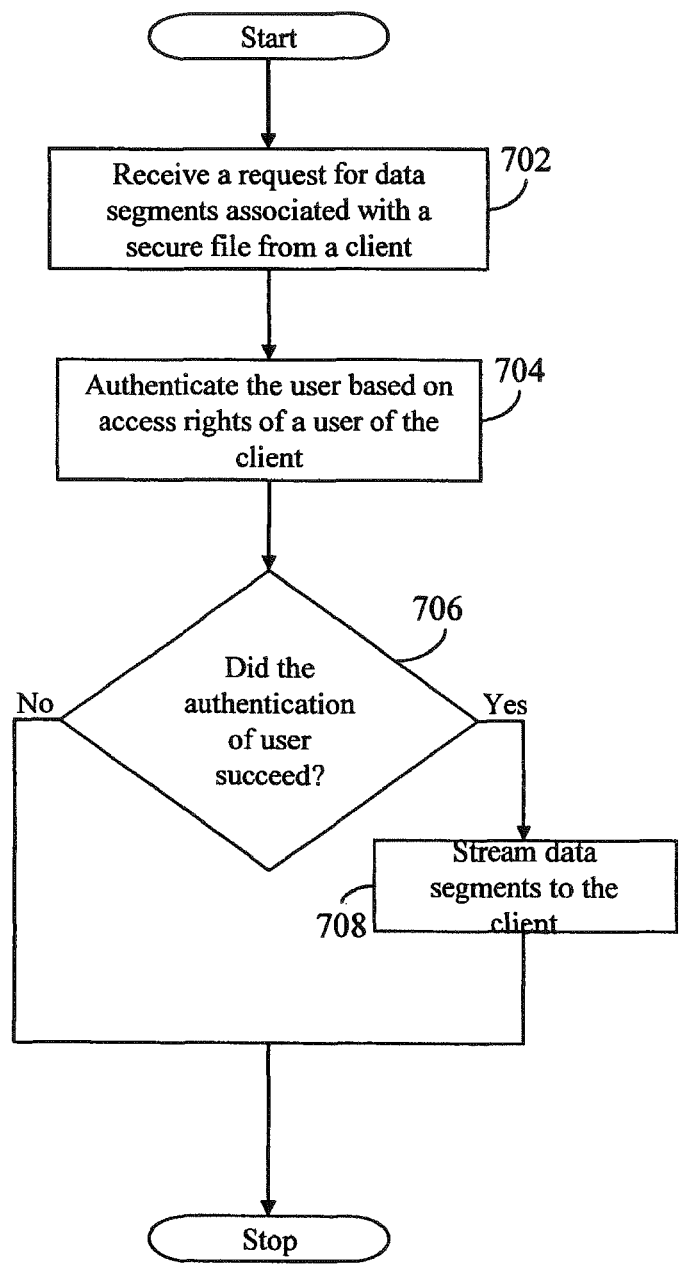
FIG. 7 is a flowchart illustrating a method for accessing a secured file, in accordance with an embodiment of the disclosure.

FIG. 7 is a flowchart illustrating a method for accessing a secured file, in accordance with an embodiment of the disclosure. A file containing confidential or sensitive information is a secured file. Examples of the confidential or sensitive information may include credit card numbers, bank account numbers, and social security numbers. None of the data segments associated with a secured file are stored in local storage 114 of client 108. Client 108 of computational device 112 generates a request to access one ore more data segments of a secured file stored in remote storage 106 of server 104. The request is generated based on the first representation of the secured file stored in local storage 114. The first representation of the secured file includes basic metadata related to the secured file. Examples of the basic metadata may include a file name, and timestamp of creation.

At step 702, server 104 receives the request for accessing one or more data segments of the secured file from client 108.

At step 704, processor 204 of server 104 authenticates the user of client 108 based on the access rights of the user of client 108 to check whether the user is authorized to access the one or more data segments of the secured file. The user can be authenticated by using various tools that implement methods for authentication. An example of a method that can be used for user authentication involves asking for a username and a password from the user. As already described, before the user can access or upload files on remote storage 106 of server 104, the user has to sign-up with server 104. By signing-up with server 104, a user account is created by rights manager 208 for the user with a username and password along with additional personal information. Each user account is provided with access rights to server 104 by rights manager 208. As a result, a list of authentic usernames and passwords are maintained at the server for authentication.

At step 706, processor 204 of server 104 checks if the authentication of the user is successful. If the authentication of the user is unsuccessful, the steps of the flowchart terminate. If the authentication of user succeeds, then at step 708, sender 206 of the server 104 streams the requested data segments of the file to client 108. On receiving the stream of the requested data segments of the file from the sender 206, the first representation of the file is transformed into a second representation of the file and provided to the user. In another embodiment, on receiving the remaining data segments, client 108 appends the received data segments with the first representation of the file. The data segments are directly accessed by client 108 without being stored in the local storage 114 or cached by the cache manager 212.

Various embodiments of the disclosure provide method and system for managing data in a communication network such as a Local Area Network (LAN), a Wide Area Network (WAN), a communication network, and the Internet. A user working on a computational device, installed with a client, is enabled to upload a file on a remote storage by placing the file in a virtual data drive. On uploading the file, most of the data segments associated with the file are moved to the remote storage. The file can either be accessed manually by the user or can be automatically downloaded whenever required by an application running on the computational device based on the metadata related to the file stored in the local storage. Further, the user can randomly access the file stored in the remote storage from any site connected to the communication network through a virtual data drive. Further, the disclosure enables the user to directly access the 5 file stored in the remote storage. In this case, the data segments associated with the file are not cached in the local storage of the user.

The method and system for managing data in a communication network, as described in the disclosure, may be embodied in the form of a computer system. Typical examples of a computer system include a general-purpose computer, a programmed microprocessor, a micro-controller, a peripheral integrated circuit element, and other devices or arrangements of devices that are capable of implementing the steps that constitute the method of the disclosure.

The computer system typically comprises a computer, an input device, and a display unit. The computer typically comprises a microprocessor, which is connected to a communication bus. The computer also includes a memory, which may include a Random Access Memory (RAM) and a Read Only Memory (ROM). Further, the computer system comprises a storage device, which can be a hard disk drive or a removable storage drive such as a floppy disk drive and an optical disk drive. The storage device can be other similar means for loading computer programs or other instructions into the computer system.

The computer system executes a set of instructions that are stored in one or more storage elements to process input data. These storage elements can also hold data or other information, as desired, and may be in the form of an information source or a physical memory element present in the processing machine. Exemplary storage elements include a hard disk, a DRAM, an SRAM, and an EPROM. The storage element may be external to the computer system and connected to or inserted into the computer, to be downloaded at or prior to the time of use. Examples of such external computer program products are computer-readable storage mediums such as CD-ROMS, Flash chips, and floppy disks.

The set of instructions may include various commands that instruct the processing machine to perform specific tasks such as the steps that constitute the method of the disclosure. The set of instructions may be in the form of a software program. The software may be in various forms such as system software or application software. Further, the software may be in the form of a collection of separate programs, a program module with a large program, or a portion of a program module. The software may also include modular programming in the form of object-oriented programming. The software program that contains the set of instructions can be embedded in a computer program product for use with a computer, the computer program product comprising a computer-usable medium with a computer-readable program code embodied therein. Processing of input data by the processing machine maybe in response to users' commands, results of previous processing, or a request made by another processing machine.

The modules described herein may include processors and program instructions that are used to implement the functions of the modules described herein. Some or all the functions can be implemented by a state machine that has no stored program instructions, or in one or more Application-specific Integrated Circuits (ASICs), in which each function or some combinations of some of the functions are implemented as custom logic.

While the various embodiments of the disclosure have been illustrated and described, it will be clear that the invention is not limited only to these embodiments, example, or implementations. Numerous modifications, changes, variations, substitutions, and equivalents will be apparent to those skilled in the art, without departing from the spirit and scope of the invention.

The invention claimed is:

1. A method for managing a plurality of files in a communication network, the communication network comprising a plurality of clients and at least one file of the plurality of files comprising one or more data segments, the method comprising:
- a. receiving metadata associated with a file, by a server, wherein the file is stored in a virtual data drive of a first client of the plurality of clients;
- b. receiving, by the server, data segments associated with the file from the virtual data drive of the first client;
- c. storing the metadata and data segments associated with the file at the server;
- d. generating, by the server, a first representation of the file based on the received metadata and data segments associated with the file;
- e. sending, by the server, the first representation of the file to the plurality of clients; and
- f. sending, by the server, at least one data segment of the file to a second client of the plurality of clients based on a request received at the server from the second client for the at least one data segment of the file.

2. The method as recited in claim 1 further comprising:
receiving, by the server, inputs to define a plurality of access rights to at least one user of a plurality of users corresponding to the plurality of clients for accessing the file.

3. The method as recited in claim 1 further comprising:
receiving, by the server, a change to the at least one data segment of the file from the second client.

4. The method as recited in claim 3 further comprising:
updating, by the server, the first representation of the file based on the received change to the at least one data segment of the file.

5. The method as recited in claim 4 further comprising:
sending, by the server, the updated first representation of the file to the plurality of clients.

6. The method as recited in claim 1 further comprising:
authenticating, by the server, the request based on a plurality of access rights of a user of the second client when the file is a secured file.

7. The method as recited in claim 6, wherein the at least one data segment of the file sent to the second client is not cached by the second client when the file is a secured file.

8. The method as recited in claim 1, wherein one or more data segments of the sent at least one data segments of the file are cached by the second client when the file is not a secured file.

9. The method as recited in claim 8, wherein the number of the one or more data segments of the sent at least one data segments cached by the second client is based on one or more parameters of the communication network.

10. A method for managing a plurality of files in a communication network, the communication network comprising a plurality of clients and at least one file of the plurality of files comprising one or more data segments, the method comprising:
- a. receiving metadata associated with a file, by a server, wherein the file is a secured file stored in a virtual data drive of a first client of the plurality of clients;
- b. receiving, by the server, data segments associated with the file from the virtual data drive of the first client;
- c. storing the metadata and data segments associated with the file at the server;
- d. generating, by the server, a first representation of the file based on the received metadata and data segments associated with the file;
- e. sending, by the server, the first representation of the file to the plurality of clients;
- f. receiving, by the server, a request from a second client of the plurality of clients for at least one data segment of the file;
- g. authenticating, by the server, the request based on a plurality of access rights of a user of the second client; and
- h. sending, by the server, the at least one data segment of the file to the second client when the request is authenticated.

* * * * *